United States Patent
Cho

(10) Patent No.: US 7,909,903 B2
(45) Date of Patent: Mar. 22, 2011

(54) AIR FILTER DEVICE

(75) Inventor: Ho-Young Cho, Seoul (KR)

(73) Assignee: Korea Pneumatic Systems Co., Ltd

( * ) Notice: Subject to any disclaimer, the term of this patent is extended or adjusted under 35 U.S.C. 154(b) by 813 days.

(21) Appl. No.: 11/664,743

(22) PCT Filed: Oct. 5, 2005

(86) PCT No.: PCT/KR2005/003289
§ 371 (c)(1),
(2), (4) Date: Apr. 5, 2007

(87) PCT Pub. No.: WO2006/080689
PCT Pub. Date: Aug. 3, 2006

(65) Prior Publication Data
US 2009/0151310 A1    Jun. 18, 2009

(30) Foreign Application Priority Data
Oct. 11, 2004    (KR) .................... 20-2004-0028701 U

(51) Int. Cl.
*B01D 19/00* (2006.01)
(52) U.S. Cl. ............. 55/392; 55/385.3; 55/413; 55/508; 55/350.1
(58) Field of Classification Search ............ 55/392, 55/385.3, 350.1, 418, 419, 476, 484, 503, 55/508, 514, 413; 123/198 E
See application file for complete search history.

(56) References Cited

U.S. PATENT DOCUMENTS

| 5,332,409 A | * | 7/1994 | Dralle .................... 55/484 |
| 5,505,753 A | * | 4/1996 | Heysek ................... 96/416 |
| 5,755,843 A | | 5/1998 | Sundquist |
| 5,938,804 A | | 8/1999 | Engel et al. |
| 6,287,355 B1 | | 9/2001 | Park |

FOREIGN PATENT DOCUMENTS
JP    08-126694    5/1996
* cited by examiner

Primary Examiner — Michael A Marcheschi
Assistant Examiner — Karla Hawkins
(74) Attorney, Agent, or Firm — Robert C. Klinger

(57) ABSTRACT

Disclosed herein is an air filter device, installed on a line of a pneumatic circuit to remove harmful impurities. The device (10) includes a main body (20) having a casing shape, a cylindrical filter cartridge (30), and a cap (40). The main body includes air inlet and outlet ports (22, 24) on opposite sides thereof. A guide ring (26) is provided adjacent to an inner wall (20a) to have a predetermined height, with a hole (28) formed in the guide ring to directly communicate with the air outlet port. The filter cartridge is accommodated in an inner space (S3) of the guide ring (26), with a filter material (34) horizontally disposed in the filter cartridge. The cap is fastened to an opening of the main body, and includes a spacer (44) which compresses the upper end of the filter cartridge.

4 Claims, 4 Drawing Sheets

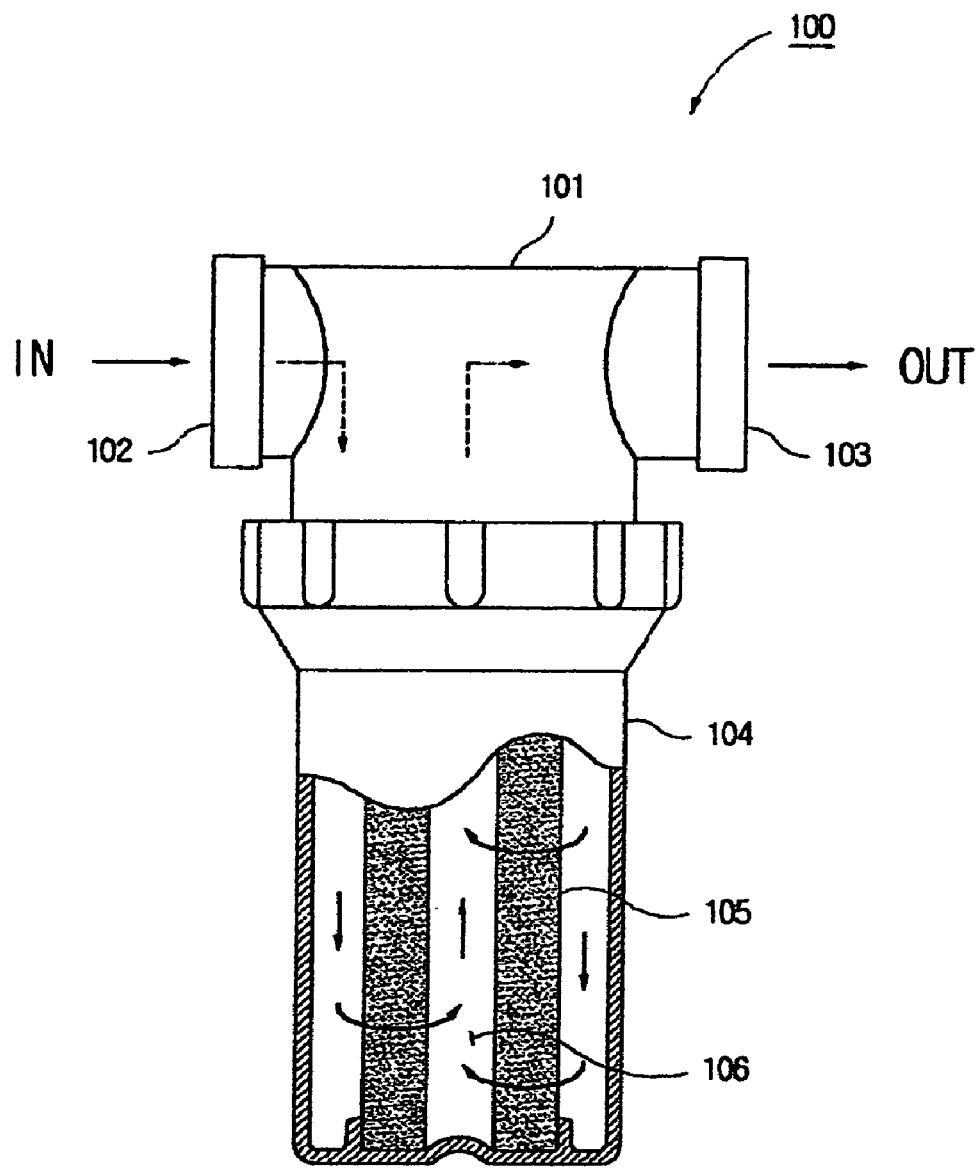
[Fig. 1] Prior Art
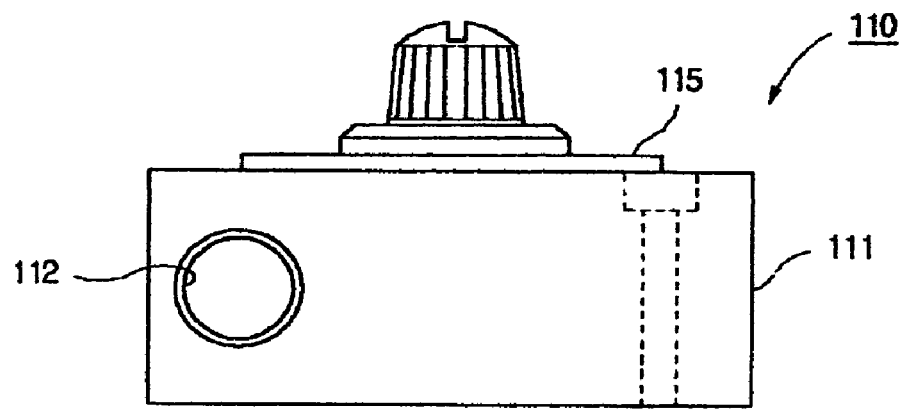
[Fig. 2] Prior Art

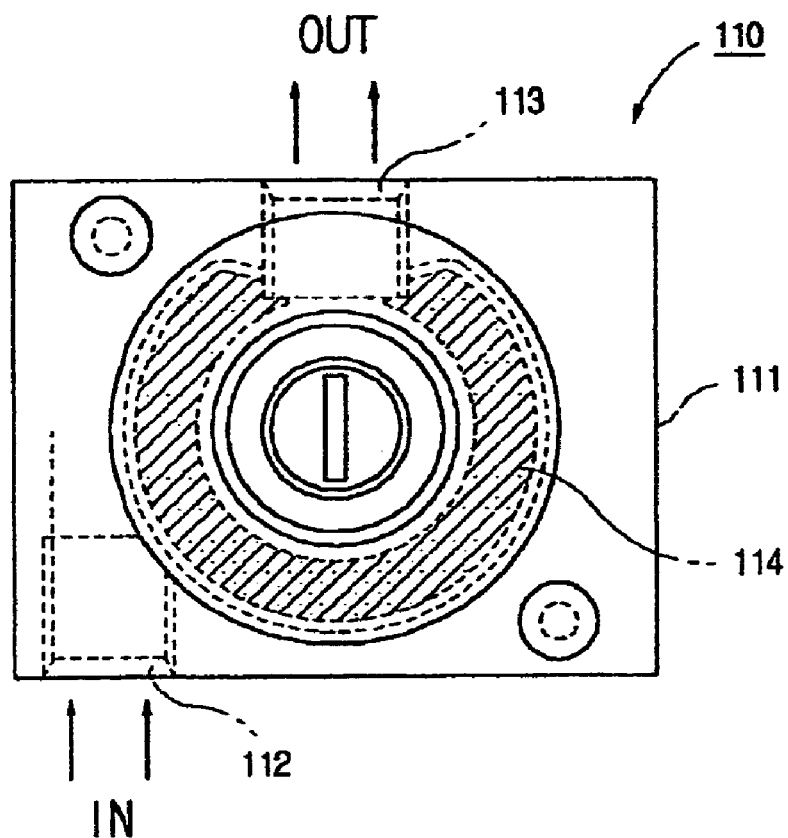
[Fig. 3] Prior Art
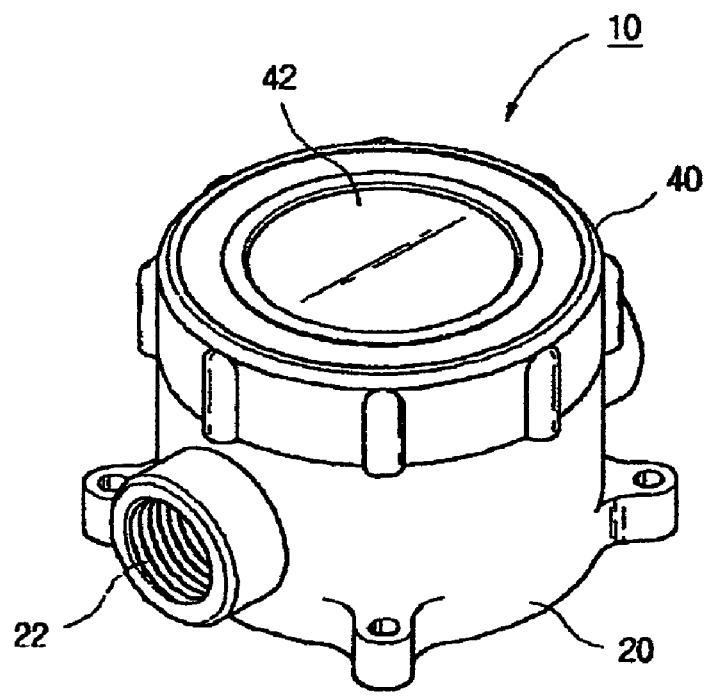
[Fig. 4]

[Fig. 5]
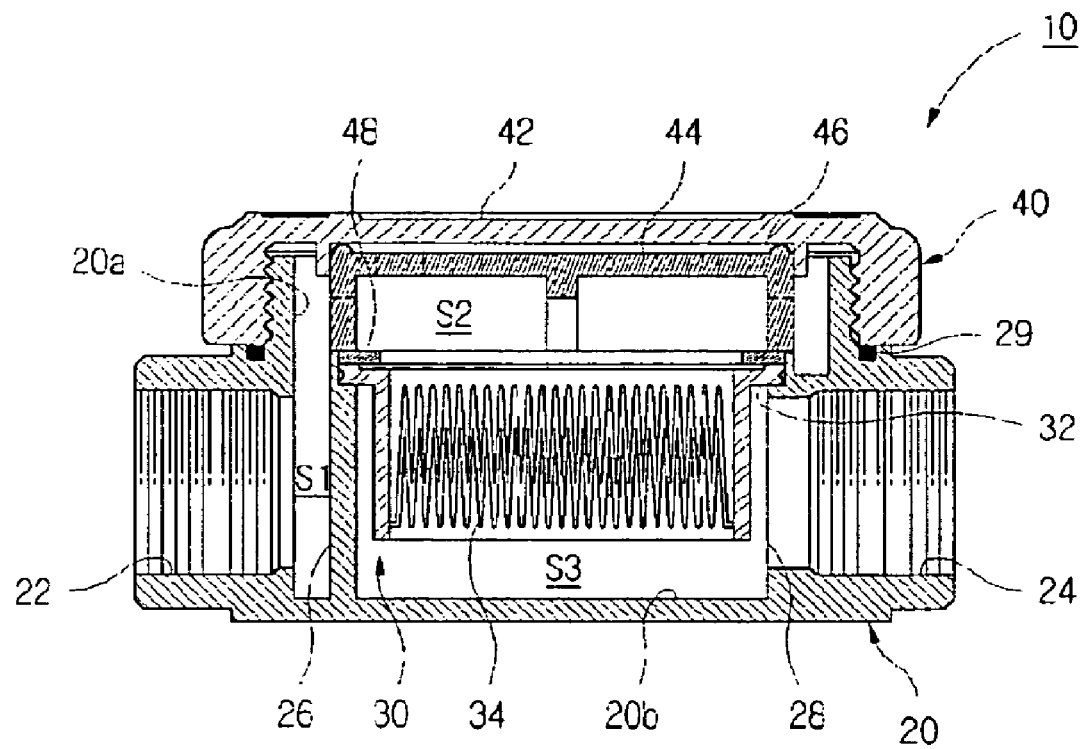
[Fig. 6]
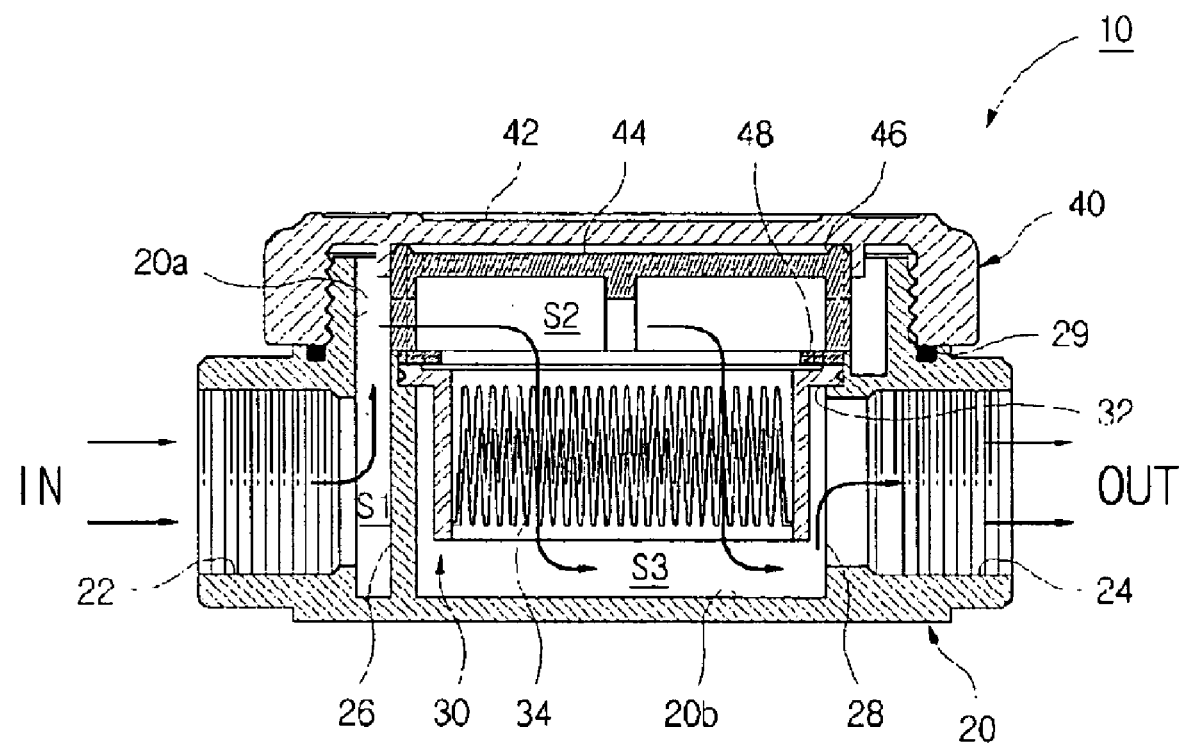

[Fig. 7]
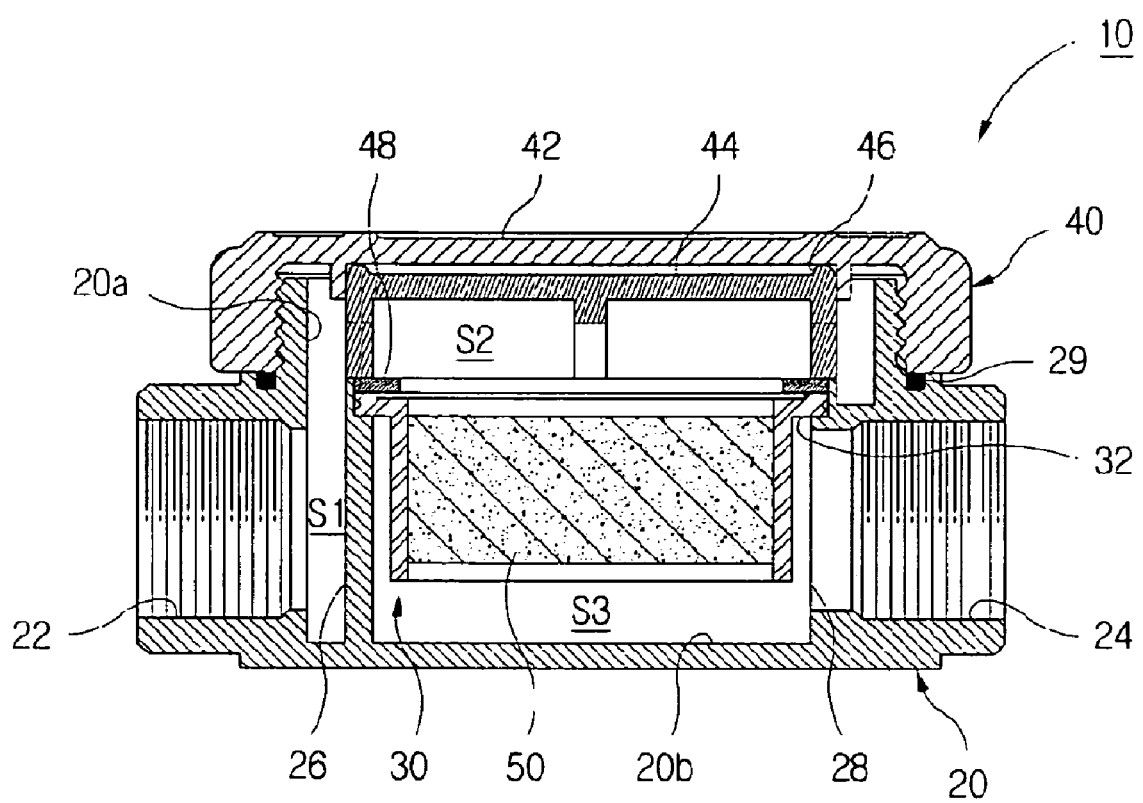

AIR FILTER DEVICE

TECHNICAL FIELD

The present invention relates, in general, to air filter devices and, more particularly, to an air filter device, which is installed on a line of a pneumatic circuit to remove harmful impurities such as dust.

BACKGROUND ART

FIG. 1 shows a conventional air filter device which is used for the same purpose as the present invention. Referring to FIG. 1, the conventional air filter device 100 includes a main body 101 which has an air inlet port 102 and an air outlet port 103, and a filter cartridge 104 which has a casing shape and is fastened to the lower portion of the main body 101. Further, a cylindrical filter material 105 is longitudinally disposed in the filter cartridge 104. Air fed through the air inlet port 102 flows downwards into the filter cartridge 104, and passes through the filter material 105 to be fed into hollow portions formed in the filter material 105. Afterwards, the air flows upwards and is discharged through the air outlet port 103 (see, the arrows). While the air passes through the cylindrical filter material 105 and flows into the hollow portions 106, the air is filtered.

As such, the conventional air filter device 100 is useful to filter air. However, the shape and the coupling structure of the filter cartridge 104 and the filter material 105 increase the total volume of the air filter device 100, so that it is inconvenient to manufacture and install the air filter device 100, and it is uneconomical.

Further, another air filter device 110, which has a simpler structure, has been proposed. As shown in FIGS. 2 and 3, the air filter device 110 includes a housing 111. An air inlet port 112 and an air outlet port 113 are formed in opposite sides of the housing 111. The interior of the housing 111 is filled with a filter material 114. A plate 115 covers the housing 111. However, the filter material 114 is not efficiently used because excessive filtering is performed at a position adjacent to the air inlet port 112.

DISCLOSURE OF INVENTION

Technical Problem

Accordingly, the present invention has been made keeping in mind the above problems occurring in the prior art, and an object of the present invention is to provide an air filter device, which is constructed so that a filter cartridge is accommodated in a main body and an air flow path is created using minimal elements and a simple method, thus accomplishing a small-sized air filter device, and allowing a filter material to be efficiently used.

Technical Solution

In order to accomplish the object, the present invention provides an air filter device, including a main body having a casing shape and including an air inlet port formed in one side of the main body, an air outlet port formed in an opposite side of the main body, and a guide ring provided adjacent to an inner wall to have a predetermined height, with a hole being formed in a predetermined portion of the guide ring in such a way as to directly communicate with the air outlet port; a cylindrical filter cartridge accommodated in an inner space of the guide ring while an upper end of the filter cartridge is seated on an upper end of the guide ring and a lower end of the filter cartridge is spaced apart from a bottom of the main body, with a filter material being horizontally disposed in the filter cartridge; and a cap fastened to an opening of the main body, and including a spacer which compresses the upper end of the filter cartridge.

In the air filter device, air fed through the air inlet port to the device is refracted by a guide ring, so that the air is introduced into a space defined by a spacer, and passes through the filter material, prior to being discharged through a hole and an air outlet port.

ADVANTAGEOUS EFFECTS

In an air filter device according to the present invention, a filter cartridge is accommodated in a main body, and the device includes minimal and optimal elements to define a path. Thus, the present invention accomplishes a very compact structure in comparison with the conventional air filter device.

BRIEF DESCRIPTION OF THE DRAWINGS

FIG. 1 is a partial sectional view of a conventional air filter device;

FIG. 2 is a side view of another conventional air filter device;

FIG. 3 is a plan view of FIG. 2;

FIG. 4 is a perspective view of an air filter device, according to the present invention;

FIG. 5 is a sectional view of FIG. 4;

FIG. 6 is a view illustrating the flow of air in FIG. 4; and

FIG. 7 is a sectional view of an air filter device, according to another embodiment of the present invention.

DESCRIPTION OF REFERENCE CHARACTERS OF IMPORTANT PARTS 10. filter device 20. main body
22. air inlet port 24. air outlet port
26. guide ring 28. hole
30. filter cartridge 34. filter material
40. cap 42. transparent window
44. spacer S1, S2, S3, spaces
50. block-type filter material

BEST MODE FOR CARRYING OUT THE INVENTION

The characteristics and operation of the present invention will be more clearly understood with reference to the preferred embodiments shown in the accompanying drawings.

Referring to FIGS. 4 and 5, an air filter device according to the present invention is denoted by reference numeral 10. The air filter device 10 includes a main body 20, a filter cartridge 30 accommodated in the main body 20, and a cap 40 fastened to an opening of the main body 20.

The main body 20 has a casing shape, with an air inlet port 22 and an air outlet port 24 formed in opposite sides of the main body 20. The main body 20 includes a guide ring 26, which is positioned adjacent to an inner wall 20a and extends from a bottom 20b to a predetermined height. A space S1, serving as an air path, is defined between the inner wall 20a and the guide ring 26.

The guide ring 26 is formed so that it is equal to or slightly higher than the upper end of the air inlet port 22. A hole 29 is formed in a predetermined portion of the guide ring 26 in such a way as to directly communicate with the air outlet port 24.

Reference numeral 29 denotes packing, which airtightly seals a gap between the main body 20 and the cap 40.

The filter cartridge 30 has a cylindrical shape, and has a filter material 34 which is horizontally installed therein. The filter cartridge 30 is appropriately disposed in a space S3 which is defined in the guide ring 26. According to this embodiment, the filter material 34 is a bellows-type filter material. However, a block-type filter material of FIG. 7 or other known filter materials may be used.

An upper flange 32 of the filter cartridge 30 is seated on the upper end of the guide ring 26, so that the filter cartridge 30 is held in the inner space S3. In such a state, the lower end of the filter cartridge 30 is not in contact with the bottom 20b of the main body 20, and a sidewall of the filter cartridge 30 does not close the hole 28.

The cap 40 has a spacer 44 therein, which compresses the upper end of the filter cartridge 30 to prevent the movement of the filter cartridge 30 accommodated in the space S3. A space S2 is defined in the cap 40 by the spacer 44. In this case, the spaces S1, S2, and S3 sequentially communicate with each other.

According to this embodiments the spacer 44 is separately manufactured. However, according to another embodiment, the spacer 44 may be integrally provided in the air filter device. An annular protrusion 46 is provided on the upper end of the spacer 44 to permit the cap 40 to be smoothly rotated.

Meanwhile, the whole portion of the cap 40 is made of a transparent material, or a transparent window 42 is provided on the upper surface of the cap 40, so that a person may view the interior of the main body 20, especially, the condition of the filter material 34 with his or her naked eye. Reference numeral 48 denotes a contact ring member which is interposed between a lower end of the spacer 44 and the upper end of the filter cartridge 30.

In the air filter device 10 according to this invention, the spaces S1, S2, and S3 sequentially communicate with each other. In order to accomplish a compact device, such a communication structure is considered as an optimal air path structure for the air filter device which is constructed so that the filter cartridge 30 is accommodated in the main body 20.

Referring to FIG. 6, the air filtering, process using the air filter device 10 of the present invention will be described in order (see the arrows). First, air is fed through the air inlet port 22 into the outer space S1 of the guide ring 26. The air is refracted upwards by the guide ring 26 to flow upwards. The air is introduced into the upper space S2 by the spacer 44. The air flows downwards and passes through the filter material 34, thus reaching the lower portion of the inner space S3 defined by the guide ring 26. During such a process, the air is filtered. The filtered air successively passes through the hole 29 formed in the guide ring 26 and the air outlet port 24, and thereafter is discharged to the outside of the air filter device.

The invention claimed is:

1. An air filter device, comprising:
a main body (20) having a casing shape, and comprising:
an air inlet port (22) formed in one side of the main body;
an air outlet port (24) formed in an opposite side of the main body; and
a guide ring (26) provided adjacent to an inner wall (20a) to have a predetermined height, with a hole (28) being formed in a predetermined portion of the guide ring in such a way as to directly communicate with the air outlet port (24);
a cylindrical filter cartridge (30) accommodated in an inner space (S3) of the guide ring (26) while an upper end of the filter cartridge is seated on an upper end of the guide ring (26) and a lower end of the filter cartridge is spaced apart from a bottom (20b) of the main body (20), with a filter material (34) being horizontally disposed in the filter cartridge; and
a cap (40) fastened to an opening of the main body (20), and including a spacer (44) which compresses the upper end of the filter cartridge (30),
wherein the air inlet port (22), a space (S1) defined between the inner wall (20a) and the guide ring (26), an inner space (S2) defined by the spacer (44), the inner space (S3) defined in the guide ring (26), the hole (28), and the air outlet port (24) sequentially communicate with each other.

2. The air filter device according to claim 1, wherein a whole portion of the cap (40) is transparent, or a transparent window (42) is provided on an upper surface of the cap (40).

3. The air filter device according to claim 1 herein the filter material (34) is selected from the group consisting of a bellows-type filter material and a block-type filter material.

4. The air filter device according to claim 2 herein the filter material (34) is selected from the group consisting of a bellows-type filter material and a block-type filter material.

* * * * *